United States Patent
Song et al.

(10) Patent No.: US 8,181,690 B2
(45) Date of Patent: May 22, 2012

(54) METHOD OF FORMING A COATED ARTICLE INCLUDING A MAGNESIUM ALLOY

(75) Inventors: Guangling Song, Troy, MI (US); Bob R. Powell, Jr., Birmingham, MI (US)

(73) Assignee: GM Global Technology Operations, Detroit, MI (US)

( * ) Notice: Subject to any disclaimer, the term of this patent is extended or adjusted under 35 U.S.C. 154(b) by 422 days.

(21) Appl. No.: 12/431,726

(22) Filed: Apr. 28, 2009

(65) Prior Publication Data

US 2010/0273023 A1   Oct. 28, 2010

(51) Int. Cl.
*B22D 19/00* (2006.01)
*B22D 19/16* (2006.01)

(52) U.S. Cl. ............... 164/98; 164/103; 164/112
(58) Field of Classification Search .......... 164/98, 164/100, 103, 112
See application file for complete search history.

(56) References Cited

U.S. PATENT DOCUMENTS

| | | | |
|---|---|---|---|
| 4,659,629 A | 4/1987 | Gartner et al. | |
| 4,973,393 A | 11/1990 | Mino et al. | |
| 6,460,602 B2 | 10/2002 | Kubota et al. | |
| 2002/0060062 A1 | 5/2002 | Nishikawa et al. | |
| 2007/0256591 A1 | 11/2007 | Simmons | |
| 2008/0078521 A1* | 4/2008 | Luo et al. | 164/98 |

FOREIGN PATENT DOCUMENTS

| | | |
|---|---|---|
| DE | 19736790 A1 | 2/1999 |
| DE | 10319630 A1 | 11/2004 |
| JP | 2002249837 | 9/2002 |

OTHER PUBLICATIONS

Zhu, Liqun, et al., "Improved corrosion resistance of AZ91D magnesium alloy by an aluminium-alloyed coating", Surface & Coatings Technology 200, (2006), pp. 2834-2840.

* cited by examiner

*Primary Examiner* — Kevin P Kerns
(74) *Attorney, Agent, or Firm* — Dierker & Associates, P.C.

(57) ABSTRACT

A method of forming a coated article is disclosed. The method involves heating a magnesium alloy component, positioning the component in a mold such that a gap exists between component outer surfaces and mold inner surfaces, and heating a magnesium-containing alloy material above its melting temperature, which is lower than that of the component. The material is formed from magnesium alloyed with i) the component element, but at a higher concentration, ii) at least one element that is different than the component element, or iii) the component element and at least one other element. The method further includes introducing the material into the gap, thereby covering at least the outer surfaces of the component, and cooling the material to form a substantially evenly distributed solidified coating on the outer surfaces of the component. The coating has a higher wear and/or corrosion resistance than that of the magnesium alloy component.

12 Claims, 4 Drawing Sheets

METHOD OF FORMING A COATED ARTICLE INCLUDING A MAGNESIUM ALLOY

TECHNICAL FIELD

The present disclosure relates generally to coated articles, and more particularly, to a method of forming a coated article including a magnesium alloy.

BACKGROUND

Magnesium and magnesium alloys have become promising alternatives to aluminum in many different applications. For example, magnesium may be used for forming structural parts in the automotive and/or aerospace industries. This is due, at least in part, to the relatively high strength-to-weight ratio of magnesium, as compared with that of aluminum.

SUMMARY

A method of forming a coated article is disclosed herein. The method includes heating a magnesium alloy component formed from magnesium alloyed with an element, positioning the component in a mold such that a gap exists between outer surfaces of the magnesium alloy component and inner surfaces of the mold, and heating a magnesium-containing alloy material above its melting temperature, the magnesium-containing alloy material melting temperature being lower than a melting temperature of the magnesium alloy component. The magnesium-containing alloy material is formed from magnesium alloyed with i) the element in the magnesium alloy component, wherein the element is present at a higher concentration in the magnesium-containing alloy material than in the magnesium alloy component, ii) at least one element that is different than the element in the magnesium alloy component, or iii) the element in the magnesium alloy component and at least one other element. The method further includes introducing the magnesium-containing alloy material into the gap, thereby covering at least the outer surfaces of the magnesium alloy component and cooling the magnesium-containing alloy material to form a substantially evenly distributed solidified coating on the outer surfaces of the magnesium alloy component. The coating has a higher wear and/or corrosion resistance than that of the magnesium alloy component.

BRIEF DESCRIPTION OF THE DRAWINGS

Features and advantages the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiment(s) of the method as disclosed herein may advantageously be used to form an article including a coated magnesium-containing alloy that exhibits improved resistance to wear and/or corrosion upon exposure to corrosive environments. The coating may also impart strength and/or hardness to the article, thereby improving the durability, fatigue strength, and/or tensile strength of the article. In some instances, such improved strength and/or hardness reduces the susceptibility of the article to brinelling and/or fretting.

As used herein, the term "corrosive environment" refers to any environment which, upon exposure thereto, will cause, or at least commence, corrosion of a metal. Non-limiting examples of corrosive environments include environments with a relative humidity higher than 75%, an environment containing water, an environment containing salt, environments containing alcohol vapors and/or other chemicals (such as, e.g., in cooling systems, fuel systems, deicing systems, cleaning solutions, etc.) and/or the like.

The articles exhibiting the improved resistance to wear and/or corrosion include various automotive and/or aerospace components that may, at some point, be exposed to a corrosive environment. Non-limiting examples of such articles include engine cradles, engine blocks, transfer cases, wheels, under-the-hood automotive components, other components that may be exposed to salt, moisture, other corrosive materials, and/or the like. It is to be understood that other articles may also be formed using the embodiments of the method described herein. These articles may include various components not necessarily related to the automotive and/or aerospace industries. Examples of non-automotive/non-aerospace articles that may be formed via the method(s) disclosed herein include, but are not limited to, tools (e.g., electrical tool boxes, etc.), various household or other building components (e.g., hand-held operating tools, various electronic equipment, etc.), marine equipment (e.g., inboard and/or outboard motors, etc.), sports equipment (e.g., golf clubs, etc.) and/or the like.

Figure 1:
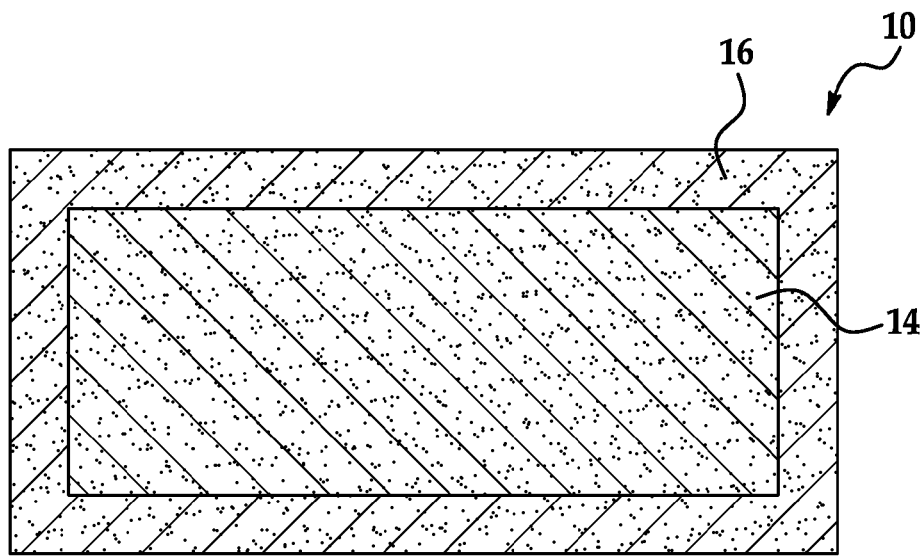
FIG. 1 is a schematic, cross-sectional view of an example of an article including a magnesium alloy component and a coating established on at least a portion thereof.

An example of a coated article 10 formed by embodiments of the method (described in further detail below in conjunction with FIGS. 2, 3, 4A, and 4B) is schematically depicted in FIG. 1. The coated article 10 generally includes a magnesium alloy component 14 having a coating composition 16 established on at least a portion thereof. Since the coating composition 16, which is also formed from a magnesium-containing alloy, alone has a greater corrosion resistance than the article 10, the coating composition 16 advantageously increases the wear and/or corrosion resistance of the magnesium alloy component 14. Without being bound to any theory, it is believed that for most magnesium alloys, secondary phases of the alloy (such as, e.g., intermetallic precipitates and/or other phases that form during solidification of the alloy) above or at a eutectic point or temperature of the alloy tend to exhibit higher wear and/or corrosion resistance than primary phases of the same magnesium alloy. Accordingly, the coating composition 16 is selected from a magnesium alloy having a melting temperature that is lower than the melting temperature of the magnesium alloy component 14.

Without being bound to yet another theory, it is further believed that the melting temperature of a magnesium alloy decreases as i) an additional alloying element is added to the magnesium alloy, and/or ii) the concentration of the same alloying element is increased. Accordingly, the coating composition 16 is also selected from materials including magnesium alloyed with i) the same alloying element as the component 14 but at a higher concentration, ii) one or more alloying elements that are different from the alloying element of the component 14, or iii) the same alloying element as the component 14 and one or more additional alloying elements that are different from that of the component 14. The magnesium alloy component 14 and the coating composition 16 will now be described in further detail, still in conjunction with FIG. 1.

As briefly mentioned above, the magnesium alloy component 14 generally includes magnesium alloyed with an element (and, in some instances, at least one element). In an embodiment, the magnesium alloy component 14 includes magnesium alloyed with aluminum. The amount of the element that the magnesium is alloyed with (in this case the aluminum) typically differs based, at least in part, on the type of element selected as the alloy material. The amount of the element also often differs based, at least in part, on the phase equilibrium between the element and the magnesium, which may be determined from the phase diagram. In the instant example, the amount of aluminum present in the component 14 ranges from about 0.01 wt % to about 9 wt %. It is to be understood that the balance of the component 14 is magnesium.

In another embodiment, the magnesium alloy component 14 includes magnesium alloyed with aluminum and at least one other element. In this embodiment, the other element(s) may be selected from zinc, manganese, zirconium, cerium, rare earth elements, calcium, lithium, silicon, yttrium, strontium, antimony, bismuth, boron, cadmium, scandium, titanium, tin, silver, palladium, tungsten, selenium, rubidium, or any other element that may be alloyed with magnesium. In an example, the amount of the aluminum and the other element(s) together in the component 14 ranges from about 0.01 wt % to about 9 wt %. It is to be understood that regardless of the amount(s) of aluminum and the other element(s) used, the balance of the component 14 is magnesium.

To reiterate from above, the coating composition 16 is established on at least a portion of the magnesium alloy component 14. In some instances, the coating composition 16 is established on the entire magnesium alloy component 14. In an embodiment, the coating composition 16 includes magnesium alloyed with the same element(s) that is/are present in the magnesium alloy component 14. For example, if the magnesium alloy component 14 includes a magnesium aluminum alloy, then the coating composition 16 also includes a magnesium-aluminum alloy. In this embodiment, the element(s) with which the magnesium is alloyed is present in the coating composition 16 at a higher concentration than the concentration of the element(s) in the magnesium alloy component 14. In an example, the amount of the element(s) present in the component 14 ranges from about 0.01 wt % to about 9 wt %. Further, in a non-limiting example, the amount of the element(s) present in the coating 16 ranges from about 9 wt % to about 99 wt %. The amount of the element(s) used in the component 14 and coating 16 may vary as is desirable, as long as the concentration of such element(s) is higher in the coating 16 than in the component 14.

In another embodiment, the coating composition 16 includes magnesium alloyed with at least one element that is different than the element in the magnesium alloy component 14. For example, if the magnesium alloy component 14 includes magnesium alloyed with aluminum, the coating composition 16 includes magnesium alloyed with any element other than aluminum. Non-limiting examples of the element for the coating composition 16 include zinc, manganese, zirconium, cerium, rare earth elements, calcium, lithium, silicon, yttrium, strontium, antimony, bismuth, boron, cadmium, scandium, titanium, tin, silver, palladium, tungsten, selenium, rubidium, or combinations thereof, as long as the selected element is different from the element present in the magnesium alloy component 14. In a non-limiting example, the element(s) that is/are different than the element in the magnesium alloy component 14 is present in the coating 16 in an amount ranging from about 1 wt % to about 99 wt %. It is to be understood that the amount of the element used in the coating 16 (that is different than element used in the component 14) has a concentration that is higher than the concentration of the different element in the component 14.

In yet another embodiment, the coating composition 16 includes magnesium alloyed with the same element that is present in the magnesium alloy component 14 and at least one other element. The magnesium-containing alloy material for the coating composition 16 may be selected from any suitable magnesium alloy system, examples of which include, but are not limited to, binary compositions, tertiary compositions, quaternary compositions, etc. In an example, if the magnesium alloy component 14 includes magnesium alloyed with aluminum, then the coating composition 16 would include magnesium alloyed with aluminum and at least one other element. Non-limiting examples of the other element(s) include zinc, manganese, zirconium, cerium, rare earth elements, calcium, lithium, silicon, yttrium, strontium, antimony, bismuth, boron cadmium, scandium, titanium, tin, silver, palladium, tungsten, selenium, rubidium, or combinations thereof. In a non-limiting example, the element that is the same as the element in the component 14 and the at least one other element together are present in the coating 16 in an amount ranging from about 9 wt % to about 99 wt %. It is to be understood that, in this example, the total amount of the elements used in the coating 16 has a concentration that is higher than the concentration of the element(s) in the component 14.

Figure 2:
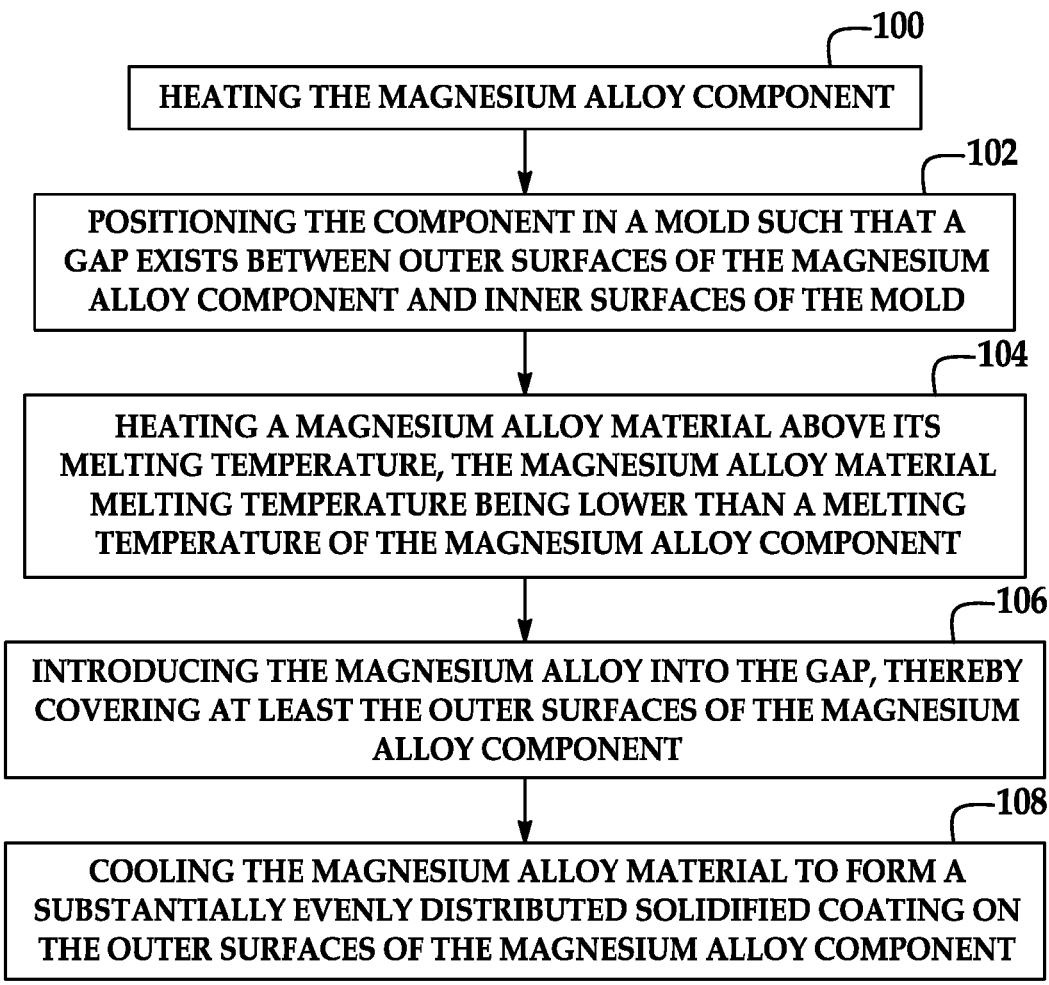
FIG. 2 is a flow diagram depicting an example of a method of forming a coated article.

An example of the method of forming the coated article 10 is generally depicted in FIG. 2. The example of the method will also be described in conjunction with FIGS. 4A and 4B (which schematically depict examples of a mold 12 used in the method for forming the coated article 10) and FIG. 3 (which depicts an example of a phase diagram of a magnesium-containing alloy material). The example of the method will be described herein using a magnesium-aluminum alloy as the magnesium alloy component 14 and a magnesium-aluminum alloy as the coating composition 16.

In the example discussed in reference to FIGS. 2, 3, 4A through 4D, the amount of aluminum present in the magnesium alloy component 14 is about 3 wt % of the total component 14, whereas the amount of aluminum present in the coating composition 16 ranges from about 65 wt % to about 70 wt % of the total coating composition 16 (thus the composition 16 has 30 wt % to 35 wt % of magnesium). It is to be understood that the magnesium-aluminum alloys are non-limiting examples, and that other magnesium alloy components 14 and/or coating compositions 16 may be used in the embodiments disclosed herein. As such, the selection of the materials for describing the example of the method shown in FIG. 2 is merely for illustrative purposes.

The example of the method of forming the coated article 10 (shown in FIG. 1) includes heating at least the magnesium alloy component 14 (reference numeral 100 in FIG. 2). The heating of the magnesium alloy component 14 may be accomplished using any conventional heating process, non-limiting examples of which include heating in an oven, heating with a hot flame, placing the component 14 under a heat lamp, exposing the component 14 to hot air, heating via homogenization, and/or the like, and/or combinations thereof. The heating is accomplished at a temperature at or above the melting temperature of the selected magnesium-containing alloy material that will be used to form the coating 16. It is to be understood that the temperature used for heating the component 14 should also be low enough such that the component 14 does not melt.

Figure 3:
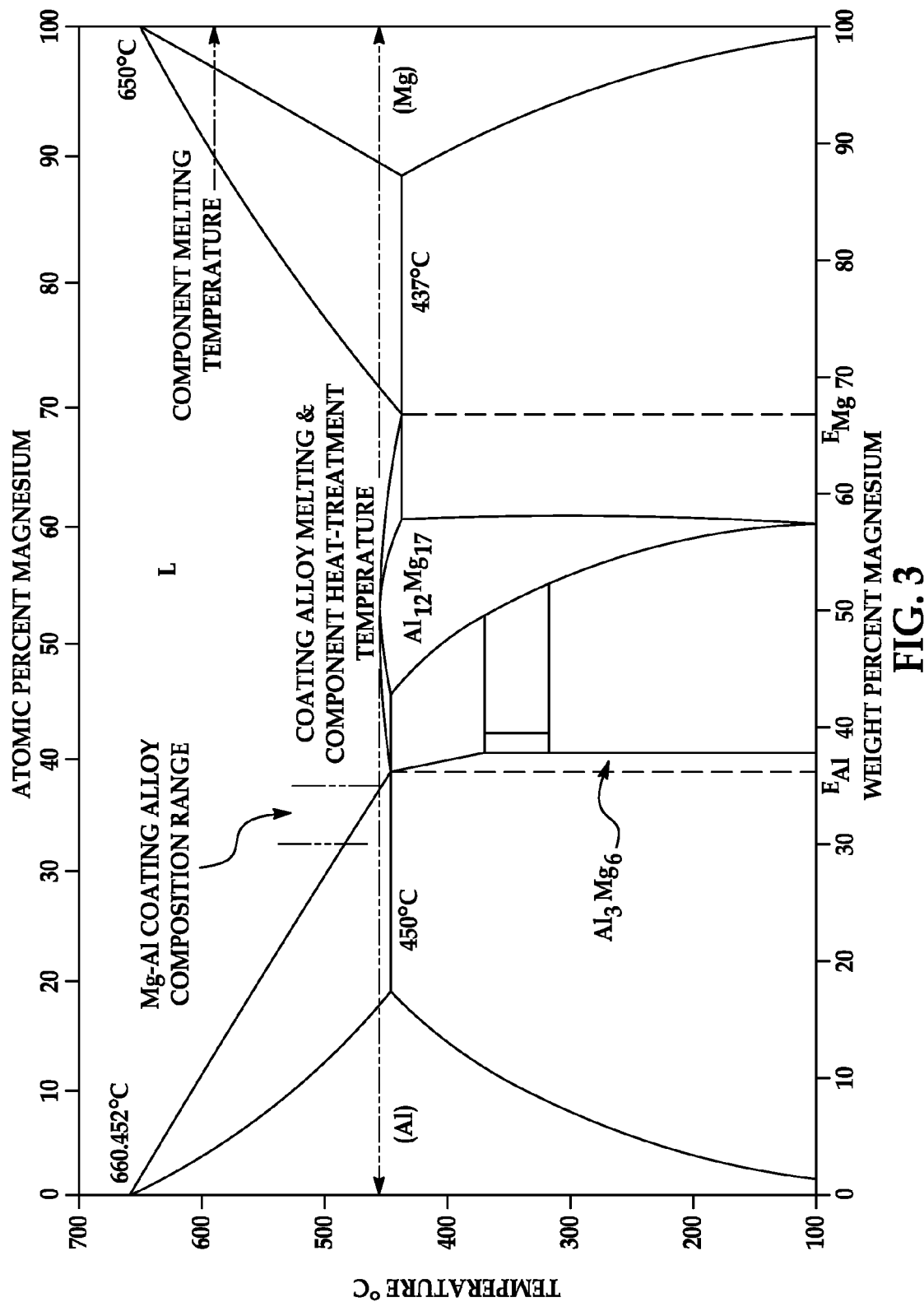
FIG. 3 is a phase diagram of a magnesium-aluminum alloy.

Referring now to the phase diagram of magnesium-aluminum alloys shown in FIG. 3, the lowest melting temperature of the magnesium alloy component 14 (which in this example includes 3 wt % aluminum) is about 600° C., while the lowest melting temperature of the magnesium-containing alloy coating composition 16, which in this example includes 65 wt % aluminum, is about 450° C. At this temperature, the composition 16 is a mixture of solids and liquids. However, at 460° C., the composition 16 is substantially completely melted (i.e., is substantially completely a liquid). Accordingly, the magnesium alloy component 14 may be heated to any temperature starting at 460° C. up to, but below 600° C.

In an embodiment, the heating of the magnesium alloy component 14 is accomplished substantially simultaneously with the introducing of the component 14 into the mold 12. Referring now to FIGS. 2, and 4A through 4D, the component 14 is positioned in the mold 12 in a manner sufficient to form a gap 18 between outer surfaces 20 of the magnesium alloy component 14 and inner surfaces 22 of the mold 12 (as shown by reference numeral 102 in FIG. 2).

Figure 4A:
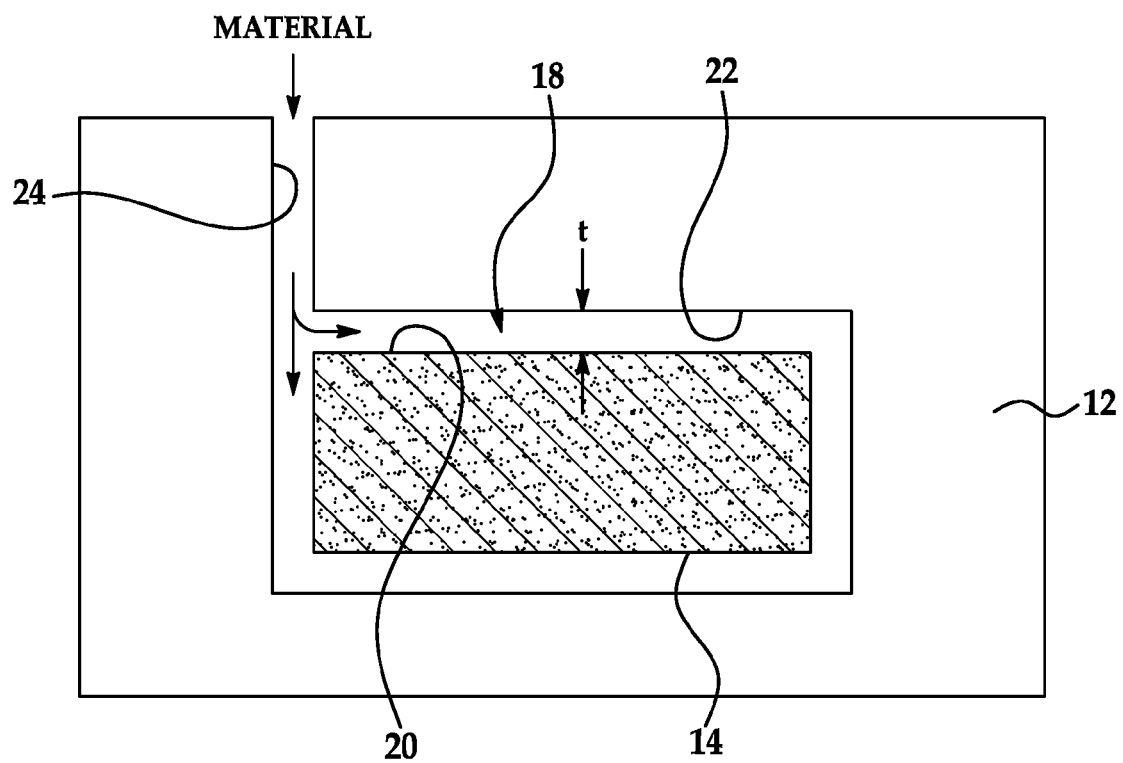
FIGS. 4A through 4D are schematic, cross-sectional views of examples of a mold including a magnesium alloy component positioned therein.
Figure 4B:
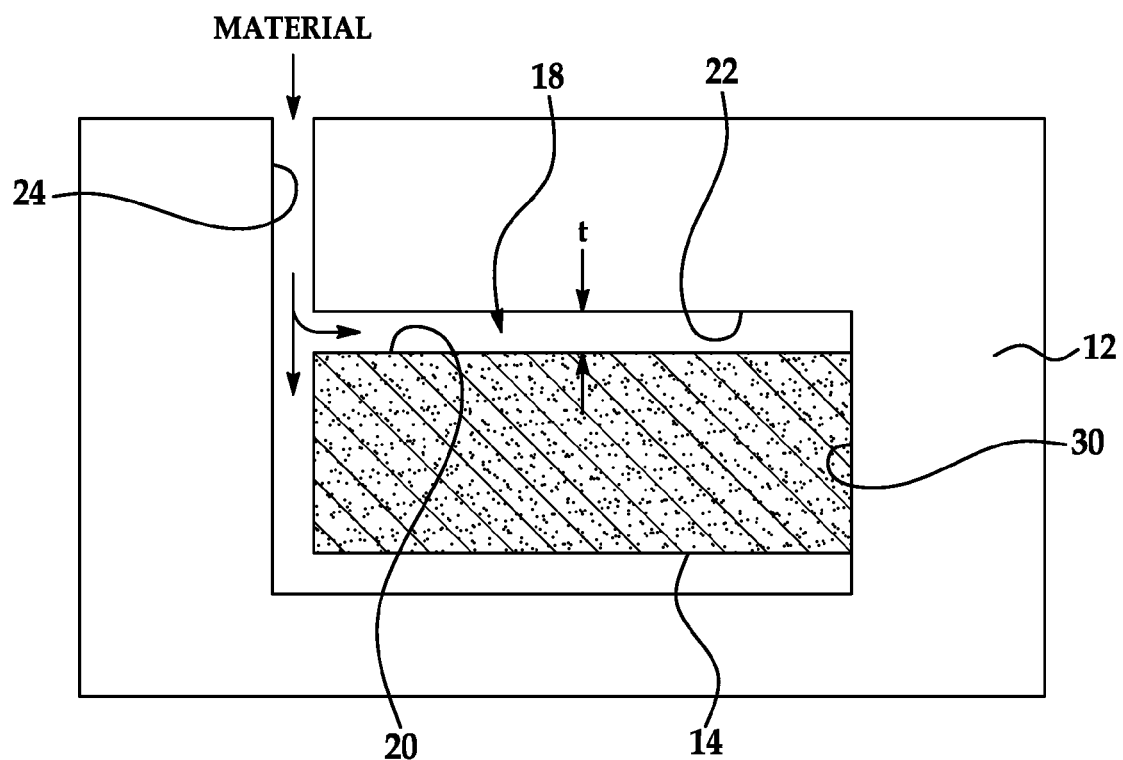
Figure 4C:
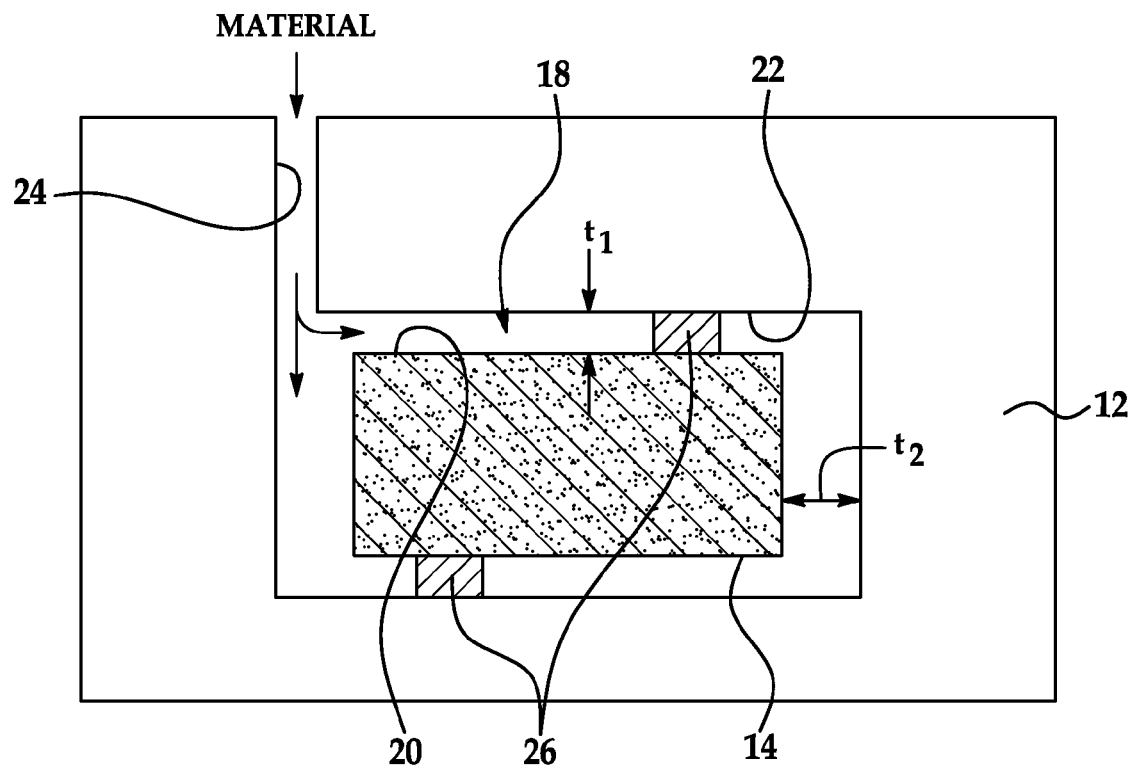
Figure 4D:
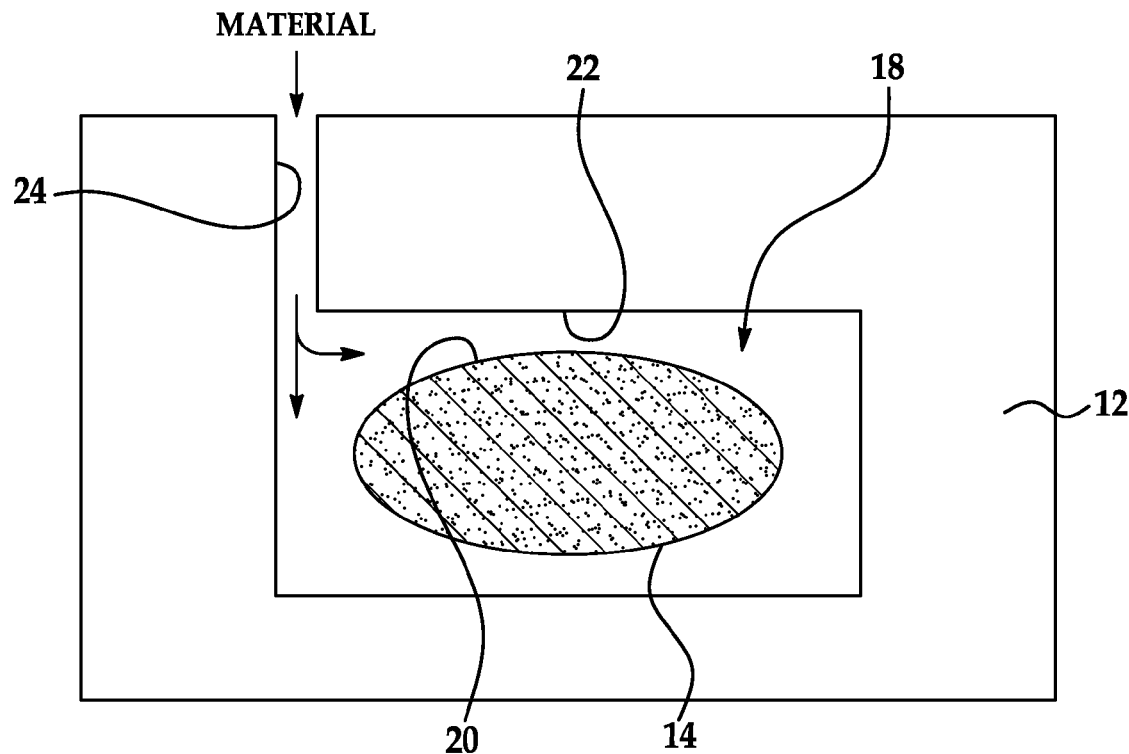

In an example, the mold 12 may have the same, similar, or even a completely different geometric shape as the magnesium alloy component 14, however the cross-sectional area of the mold 12 is at least slightly larger than that of the component 14. Accordingly, when the component 14 is positioned inside the mold 12, the gap 18 is formed between all of the outer surfaces of the mold 12 and the component 14. In one example (as shown in FIG. 4A), the shapes of the component 14 and mold 12 are the same, and thus a thickness t of the gap 18 is substantially uniform around the entire periphery of the magnesium alloy component 14. In another example (shown in FIG. 4B), the component 14 may be positioned against one or more surfaces (e.g., against a single surface 30, as shown in FIG. 4B) of the mold 12 so that the component 14 abuts the surface 30 and no gap is formed therebetween. The example shown in FIG. 4B may be desirable when no coating composition 16 is desirable on the surface(s) of the component 14 abutting the mold 12. In yet another example (as shown in FIG. 4C), the component 14 and the mold 12 have a slightly different shape such that the gap 18 has multiple thicknesses $t_1$, $t_2$ at different positions along the outer surfaces 20 of the component 14. The example shown in FIG. 4C may be desirable when a thicker coating 16 is desirable on certain surfaces 20 of the component 14. In still another example, the shape of the mold 12 may be completely different from the shape of the component 14. As shown in FIG. 4D, the mold 12 may be, e.g., rectangular shaped, while the component 14 may be, e.g., oval shaped. In this example, the thickness of the gap 18 may vary along the periphery of the outer surface 20 of the component 14. Depending upon the shapes used, two or more areas of the gap 18 may have the same thickness, or the entire thickness of the gap 18 may continuously vary such that no areas of the gap 18 have the same thickness.

It is to be understood that the magnesium alloy component 14 may be fixed inside the mold 12 once the component 14 is positioned therein. Referring back to FIG. 4C, the fixing may be accomplished using at least one holder 26. In an example, the holder(s) 26 is a chaplet, a disk, a coupon, or other suitable object configured to support the component 14 when positioned inside the mold 12. In an embodiment, the holder(s) 26 is/are formed from magnesium alloyed with at least one element. In many instances, the holder(s) 26 is/are formed from a magnesium alloy that has a higher melting point or temperature than that of the magnesium-containing alloy material used to form the coating 16.

The method further includes heating a magnesium-containing alloy material above its melting temperature, the magnesium-containing alloy material melting temperature being lower than the melting temperature of the magnesium alloy component 14 (as shown by reference numeral 104 in FIG. 2). The magnesium-containing alloy material refers to the material that is used to ultimately form the coating 16 on the magnesium alloy component 14. Referring back to the example described above where the component 14 and the coating 16 materials are both selected from magnesium-aluminum alloys having the phase diagram shown in FIG. 3, the magnesium-containing alloy material is heated to a temperature above 460° C. At such a temperature, the magnesium-containing alloy material is in a molten state.

Referring back to FIGS. 4A through 4D, the magnesium-containing alloy material (in its molten state) is then introduced into the gap 18, thereby covering at least the outer surfaces 20 of the magnesium alloy component 14 (as shown by reference numeral 106 in FIG. 2). Introducing may be accomplished, for example, by pouring the molten magnesium-containing alloy material into the gap 18 via a pour-in well 24. The introducing may also be accomplished, for example, using a die-casting process. The molten material will flow through the well 24 and into the gap 18, eventually filling up the entire gap 18. The molten material will also heat up the component 14 upon contacting it in instances where the component 14 has not already been heated (via, e.g., a pre-heating treatment) to the temperature of the molten material. Once the molten material fills up the gap 18, diffusion and a metallurgical reaction occurs between the molten material and the component 14, which suitably bond the molten material to the outer surface(s) 20 of the component 14. In some instances, the mold 12 may also include an over-flow well (not shown) configured to collect the over-flow of the molten material as the gap 18 is filled.

In another variation of the method, the heating of the magnesium alloy component 14 and of the magnesium-containing alloy material that will be used to ultimately form the coating 16 may occur substantially simultaneously. In this variation, the magnesium alloy component 14 may be positioned inside the mold 12 prior to heating the component 14. Then the magnesium-containing alloy material is introduced into the gap 18 prior to heating the material. The introduction of the material into the gap 18 may be accomplished by opening the mold 12 and placing a solid form (e.g., particles) of the material into at least a portion of the gap 18. After the mold 12 is closed, both the magnesium-containing alloy material and the component 14 are heated at the same/substantially the same time. The heating causes i) the component 14 to heat up without melting the component 14, and ii) the material to melt and flow into all portions of the gap 18, thereby completely surrounding the component 14.

In yet another variation of the method, the magnesium alloy component 14 may be placed into the mold 12 prior to heating the component 14. The magnesium-containing alloy material in this example is heated, and then the heated material is introduced into the gap 18 in its molten state. As the molten material flows into the gap 18, the heat from the heated material transfers to the component 14, thereby heating the component 14. It is to be understood that because the temperature of the molten material is lower than the melting temperature of the component 14, as the molten material contacts the component 14, the component 14 is heated to a temperature substantially below its melting temperature. Accordingly, the component 14 does not melt. It is further to be understood that, in the instant variation of the method, the reaction(s) between the component 14 and the coating 16 material may occur relatively quickly. Accordingly, the heating should be accomplished for a more shortened time period in order to limit the reaction(s), however such heating should be accomplished for a long enough time interval in order to achieve sufficient bonding of the coating 16 to the component 14.

After the magnesium-containing alloy material has been introduced into the gap 18, the method further includes cooling the magnesium-containing alloy material to form a substantially evenly distributed solidified coating 16 on the outer surfaces 20 of the magnesium alloy component 14 (as shown by reference numeral 108 in FIG. 2). After the coating 16 is formed on the magnesium alloy component 14, the mold 12 is opened and the coated article 10 is removed from the mold 12.

In instances where one or more holders 26 are used to support the component 14 inside the mold 12, the method includes heating the component 14 and the holder(s) 26 together to the melting temperature of the coating 16 material. Then the melted coating 16 material is introduced into the gap 18. Upon introducing the material into the gap 18, the material flows over/around the holder(s) 26. When the material is cooled, the holder(s) 26 fuse to the material and become part of the coating composition 16.

The coating 16 generally has a thickness defined by the thickness t (or, for example, $t_1$ and $t_2$) of the gap 18 inside the mold 12. The thickness of the coating 16 is often pre-selected based, for example, on the desired structural integrity of the article 10 to be formed, the use of such article 10 (e.g., if the article 10 will be exposed to extremely corrosive environments, if the article 10 will often be exposed to corrosive environments, if the article 10 will be exposed to environments where chipping or other wear on the article 10 may occur, and/or the like). In such instances, the thickness of the coating 16 may be adjusted as desired. For example, if the article 10 is a wheel, whereby an edge or bead thereof may be easily chipped during use, the coating 16 may be thicker along the edge or bead than in other areas where chipping is not likely to occur or occur often. Adjustments to the coating thickness may be accomplished, for example, by modifying the volume of the gap 18 formed inside the mold 12. Modifying the gap 18 may be accomplished by adjusting the size of the mold 12 and/or the size of the component 14.

In some instances where the magnesium-containing alloy material for the coating 16 includes magnesium alloyed with the same element that is present in the magnesium alloy component 14 and at least one other element, the coating 16 is a hypoeutectic system of i) a matrix phase of the magnesium alloyed with the element, and ii) a eutectic phase of the magnesium alloyed with the element and the other element(s). Referring again to the phase diagram depicted in FIG. 3, with respect to pure magnesium (identified at the right hand side of the diagram), suitable hypoeutectic systems include any magnesium-aluminum composition having a magnesium wt % greater than that of the eutectic point $E_{Mg}$ for pure magnesium. Using the example set forth in FIG. 3, the hypoeutectic system may include, e.g., compositions having greater than about 67 wt % of magnesium. Furthermore, with respect to pure aluminum (identified at the left hand side of the diagram), suitable hypoeutectic systems include any magnesium-aluminum composition having a magnesium wt % less than that of the eutectic point $E_{Al}$ for pure aluminum. Using the example set forth in FIG. 3, the hypoeutectic system may include, e.g., compositions having less than about 36 wt % of magnesium. In instances where the coating 16 is a hypoeutectic system, the coating 16 includes intermetallic precipitates of the eutectic phase magnesium alloyed with the element and the at least one other element distributed around the matrix phase magnesium alloyed with just the one element.

Additionally, in other instances where the magnesium-containing alloy material includes magnesium alloyed with the same element that is present in the magnesium alloy component 14 and at least one other element, the coating 16 is a hypereutectic system of i) a matrix phase of the magnesium alloyed with the at least one other element, and ii) a eutectic phase of the magnesium alloyed with the element and the at least one other element. Referring yet again to the phase diagram depicted in FIG. 3, with respect to pure magnesium (identified at the right hand side of the diagram), suitable hypereutectic systems include any magnesium-aluminum composition having a magnesium wt % less than that of the eutectic point $E_{Mg}$ for pure magnesium. Using the example set forth in FIG. 3, the hypereutectic system may include, e.g., compositions having less than about 67 wt % of magnesium. Furthermore, with respect to pure aluminum (identified at the left hand side of the diagram), suitable hypereutectic systems include any magnesium-aluminum composition having a magnesium wt % greater than that of the eutectic point $E_{Al}$ for pure aluminum. Using the example set forth in FIG. 3, the hypereutectic system may include, e.g., compositions having greater than about 36 wt % of magnesium. In instances where the coating 16 is a hypereutectic system, the coating 16 includes intermetallic precipitates of the eutectic phase magnesium alloyed with the element and the at least one other element distributed around the matrix phase magnesium alloyed with the at least one other element.

In yet other instances where i) the magnesium-containing alloy material includes magnesium alloyed with the same element as the component 14 but at a higher concentration, and ii) the magnesium is alloyed with a different element, the coating 16 includes more secondary phases and a matrix phase containing more of the alloying element(s). In any of the systems provided hereinabove, the intermetallic precipitates (or secondary phases) in the coating 16 improves the wear and/or corrosion resistance of the coated article 10 based, at least in part, on the theories described hereinabove.

While several embodiments have been described in detail, it will be apparent to those skilled in the art that the disclosed embodiments may be modified. Therefore, the foregoing description is to be considered exemplary rather than limiting.

The invention claimed is:
1. A method of forming a coated article, the method comprising:
heating a magnesium alloy component formed from magnesium alloyed with an element;
positioning the component in a mold such that a gap exists between outer surfaces of the magnesium alloy component and inner surfaces of the mold;
heating a magnesium-containing alloy material above its melting temperature, the magnesium-containing alloy material melting temperature being lower than a melting temperature of the magnesium alloy component, and wherein the magnesium-containing alloy material is formed from magnesium alloyed with i) the element in the magnesium alloy component, wherein the element is present at a higher concentration in the magnesium-containing alloy material, ii) at least one element that is different than the element in the magnesium alloy com- ponent, or iii) the element in the magnesium alloy component and at least one other element;

introducing the magnesium-containing alloy material into the gap, thereby covering at least the outer surfaces of the magnesium alloy component; and cooling the magnesium-containing alloy material to form a substantially evenly distributed solidified coating on the outer surfaces of the magnesium alloy component, the coating having a higher wear resistance, corrosion resistance, or combinations thereof than that of the magnesium alloy component.

2. The method as defined in claim 1 wherein the heating of the magnesium alloy component is accomplished at or above the melting temperature of the magnesium-containing alloy material.

3. The method as defined in claim 2 wherein the heating of the magnesium alloy component and the heating of the magnesium-containing alloy material is accomplished substantially simultaneously.

4. The method as defined in claim 3 wherein the substantially simultaneous heating of the magnesium alloy component and the magnesium-containing alloy material is accomplished after i) the magnesium alloy component is placed in the mold, and ii) the magnesium-containing alloy material is introduced into the gap.

5. The method as defined in claim 1 wherein the mold has substantially a same geometric shape as that of the magnesium alloy component, and wherein the gap between the outer surfaces of the magnesium alloy component and the inner surfaces of the mold is substantially uniform around the entire magnesium alloy component.

6. The method as defined in claim 1 wherein the mold has substantially a same geometric shape as that of the magnesium alloy component, and wherein the gap between the outer surface of the magnesium alloy component and the inner surfaces of the mold has a thickness that varies at different positions of the outer surface of the magnesium alloy component.

7. The method as defined in claim 1 wherein the magnesium-containing alloy material includes magnesium alloyed with the element in the magnesium alloy component and at least one other element, and wherein the substantially evenly distributed solidified coating is a hypoeutectic system of i) a matrix phase of the magnesium alloyed with the element, and ii) a eutectic phase of the magnesium alloyed with the element and the at least one other element, wherein the coating includes intermetallic precipitates of the eutectic phase magnesium alloyed with the element and the at least one other element distributed around the matrix phase magnesium alloyed with the element.

8. The method as defined in claim 1 wherein the magnesium-containing alloy material includes magnesium alloyed with the element in the magnesium alloy component and at least one other element, and wherein the substantially evenly distributed solidified coating is a hypereutectic system of i) a matrix phase of the magnesium alloyed with the at least one other element, and ii) a eutectic phase of the magnesium alloyed with the element and the at least one other element, wherein the coating includes intermetallic precipitates of the eutectic phase magnesium alloyed with the element and the at least one other element distributed around the matrix phase magnesium alloyed with the at least one other element.

9. The method as defined in claim 1 wherein the substantially evenly distributed solidified coating has a thickness, and wherein the method further comprises adjusting the thickness of the coating by modifying a volume of the gap formed between the inner surfaces of the mold and the outer surfaces of the magnesium alloy component.

10. The method as defined in claim 1 wherein after positioning the magnesium alloy component in the mold, the method further comprises fixing the magnesium alloy component to the mold.

11. The method as defined in claim 10 wherein fixing the magnesium alloy component to the mold is accomplished using at least one holder, the at least one holder formed from magnesium alloyed with at least one element, wherein the at least one holder has a melting point that is higher than a melting point of the magnesium-containing alloy material.

12. The method as defined in claim 1 wherein at least one of:

the element is aluminum;

the at least one element that is different from the element in the magnesium alloy component is selected from zinc, manganese, zirconium, cerium, rare earth elements, calcium, lithium, silicon, yttrium, strontium, antimony, bismuth, boron, cadmium, scandium, titanium, tin, silver, palladium, tungsten, selenium, rubidium, or combinations thereof; or the at least one other element is selected from aluminum, zinc, manganese, zirconium, cerium, rare earth elements, calcium, lithium, silicon, yttrium, strontium, antimony, bismuth, boron, cadmium, scandium, titanium, tin, silver, palladium, tungsten, selenium, rubidium, or combinations thereof.

* * * * *